United States Patent [19]
Nguyen

[11] Patent Number: 6,069,471
[45] Date of Patent: May 30, 2000

[54] DYNAMIC SET POINT SWITCHING REGULATOR

[75] Inventor: Don J. Nguyen, Portland, Oreg.

[73] Assignee: Intel Corporation, Santa Clara, Calif.

[21] Appl. No.: 09/079,428

[22] Filed: May 14, 1998

[51] Int. Cl.[7] .................................................. G05F 1/59
[52] U.S. Cl. ............................................ 323/271; 323/282
[58] Field of Search .................................. 700/226, 225, 700/215, 229, 115; 235/375, 385; 323/268, 271, 282, 284

[56] References Cited

U.S. PATENT DOCUMENTS

| | | | |
|---|---|---|---|
| 4,190,823 | 2/1980 | Leichle . | |
| 4,232,364 | 11/1980 | Bibbero . | |
| 4,733,152 | 3/1988 | Allington . | |
| 4,794,369 | 12/1988 | Haferd . | |
| 5,079,498 | 1/1992 | Cleasby et al. | 323/284 |
| 5,532,577 | 7/1996 | Doluca | 323/282 |
| 5,627,460 | 5/1997 | Bazinet et al. | 323/284 |
| 5,705,919 | 1/1998 | Wilcox | 323/282 |
| 5,757,173 | 5/1998 | Agiman | 323/282 |
| 5,808,455 | 9/1998 | Schwartz et al. | 323/271 |
| 5,812,860 | 9/1998 | Horden et al. . | |
| 5,847,554 | 12/1998 | Wilcox et al. | 323/282 |
| 5,959,441 | 9/1999 | Brown | 323/284 |
| 5,959,443 | 9/1999 | Littlefield | 323/284 |
| 5,982,160 | 11/1999 | Walters et al. | 323/282 |
| 5,982,161 | 11/1999 | Nguyen et al. | 323/284 |

Primary Examiner—Jeffrey Sterrett
Attorney, Agent, or Firm—Seth Z. Kalson

[57] ABSTRACT

A switching DC-to-DC converter comprising a controller to regulate a load voltage according to a set-point and a sample-and-hold circuit, the sample-and-hold circuit coupled to the controller to decrease the set-point of the controller if an average of current flowing through the inductor increases.

16 Claims, 5 Drawing Sheets

DYNAMIC SET POINT SWITCHING REGULATOR

FIELD OF INVENTION

The present invention relates to DC-to-DC voltage regulators.

BACKGROUND

To extend battery life and reduce power consumption, microprocessors for mobile use may have various power modes, such as a stop-clock mode and an active mode. The microprocessor is put in its active mode when its execution units are needed, and is put in its stop-clock mode when the execution units are not immediately needed. To conserve power, the microprocessor draws less current during its stop-clock mode than during its active mode.

A DC-to-DC voltage converter provides a regulated voltage for the microprocessor. FIG. 1 is a functional diagram of a step-down switching DC-to-DC voltage converter connected to a microprocessor, where the microprocessor is idealized as current sink 102. Microprocessor 102 sinks current I, which varies depending upon whether microprocessor 102 is in its stop-clock or active mode. The voltage to be regulated is the voltage at node 110 and, ignoring voltage drops along line 111, is the core voltage of microprocessor 102, denoted as $V_{core}$. A voltage source 104 provides a stable reference voltage, denoted as $V_0$, to controller 106. Feedback path 108 samples the voltage at node 110.

Controller 106 switches FETs (Field Effect Transistor) 112 and 114 ON and OFF in complementary fashion so as to energize and de-energize inductor 116. FETs 112 and 114 should be switched so as not to be simultaneously ON. Controller 106 switches FET 114 OFF and FET 112 ON to raise the voltage at node 110, and switches FET 112 OFF and FET 114 ON to lower the voltage at node 110. Capacitor 118 helps to smooth-out the voltage at node 110. Resistor 120 represents the parasitic resistance of capacitor 118 and its lead. Not shown is the parasitic inductance of capacitor 118 and its lead. By appropriately switching FETs 112 and 114, the voltage at node 110 is regulated to be substantially constant provided microprocessor 102 is not changing modes.

FIG. 2a illustrates ideal transitions of current I due to microprocessor 102 changing modes, and FIG. 2b illustrates the voltage $V_{core}$ at node 110 due to these current transitions. For the example of FIG. 2a, current I increases at time $t_1$ due to a mode change from stop-clock to active, and decreases at time $t_2$ due to a mode change from active to stop-clock. Let $V_r$ denote the desired voltage for $V_{core}$. ($V_r$ will also be referred to as the set-point.) When current I undergoes a sudden increase at time $t_1$, the current flowing through inductor 116 cannot increase instantaneously, and consequently the additional current needed by microprocessor 102 is supplied from capacitor 118. This additional current increases the magnitude of the voltage drops across resistor 120 and capacitor 118, which causes the voltage $V_{core}$ at node 110 to suddenly decrease. To bring $V_{core}$ up to $V_r$, control circuit 106 keeps FET 112 ON and FET 114 OFF. The current flowing through inductor 116 will then increase (with positive time derivative) to bring $V_{core}$ to $V_r$. This is illustrated in FIG. 2b at time $t_1$.

Similarly, when microprocessor 102 changes from its active mode to its stop-clock mode at time $t_2$, current I suddenly decreases. Again, because current flow through inductor 116 cannot decrease instantaneously, capacitor 118 must sink additional current, This causes a sudden increase in $V_{core}$ at time $t_2$, which is eventually brought down to $V_r$ by keeping FET 112 OFF and FET 114 ON. This is illustrated in FIG. 2b at time $t_2$.

As a result of microprocessor 102 changing modes, the voltage at node 110 varies between some maximum or peak voltage $V_p$ and some minimum voltage $V_m$. For simplicity, we assume that the voltage differences $|V_p-V_r|$ and $|V_m-V_r|$ are equal to each other, and we denote this difference by $\Delta$. Note that the total voltage excursion for FIG. 2b, $|V_p-V_m|$, is equal to $2\Delta$.

The value of $\Delta$ depends upon the time derivative of current during a mode change, the values of resistor 120 and capacitor 118 (and any parasitic inductance not explicitly shown), the value of inductor 116, and how quickly controller 106 responds to a changing core voltage. A larger inductor 116 and capacitor 118 reduces steady state ripple in the core voltage when there is no power mode change, but increases $\Delta$. For proper operation, $V_p$ and $V_m$ need to be within some operating range $[V_{low}, V_{high}]$.

Clearly, tradeoffs can be made between voltage ripple, response time, and $\Delta$. However, once such a tradeoff has been made, it is desirable to keep the total voltage swing $|V_p-V_m|$ as small as possible. This is particularly important in low voltage applications, where the set-point $V_r$ should be as low as needed without $V_m$ dropping below $V_{low}$.

DESCRIPTION OF EMBODIMENTS

Figure 1:
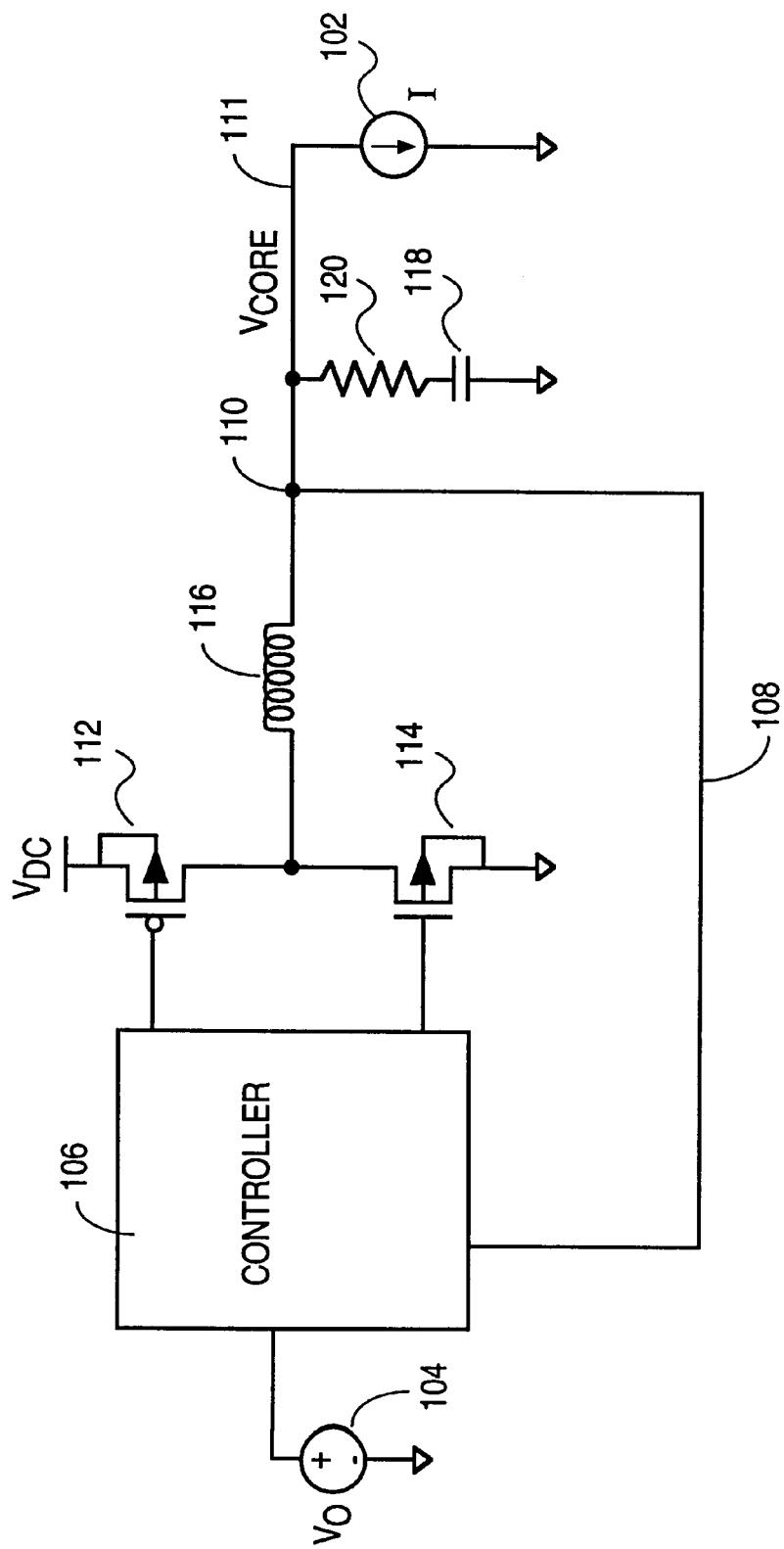
FIG. 1 is a functional diagram of a prior art DC-to-DC voltage converter.
Figure 3:
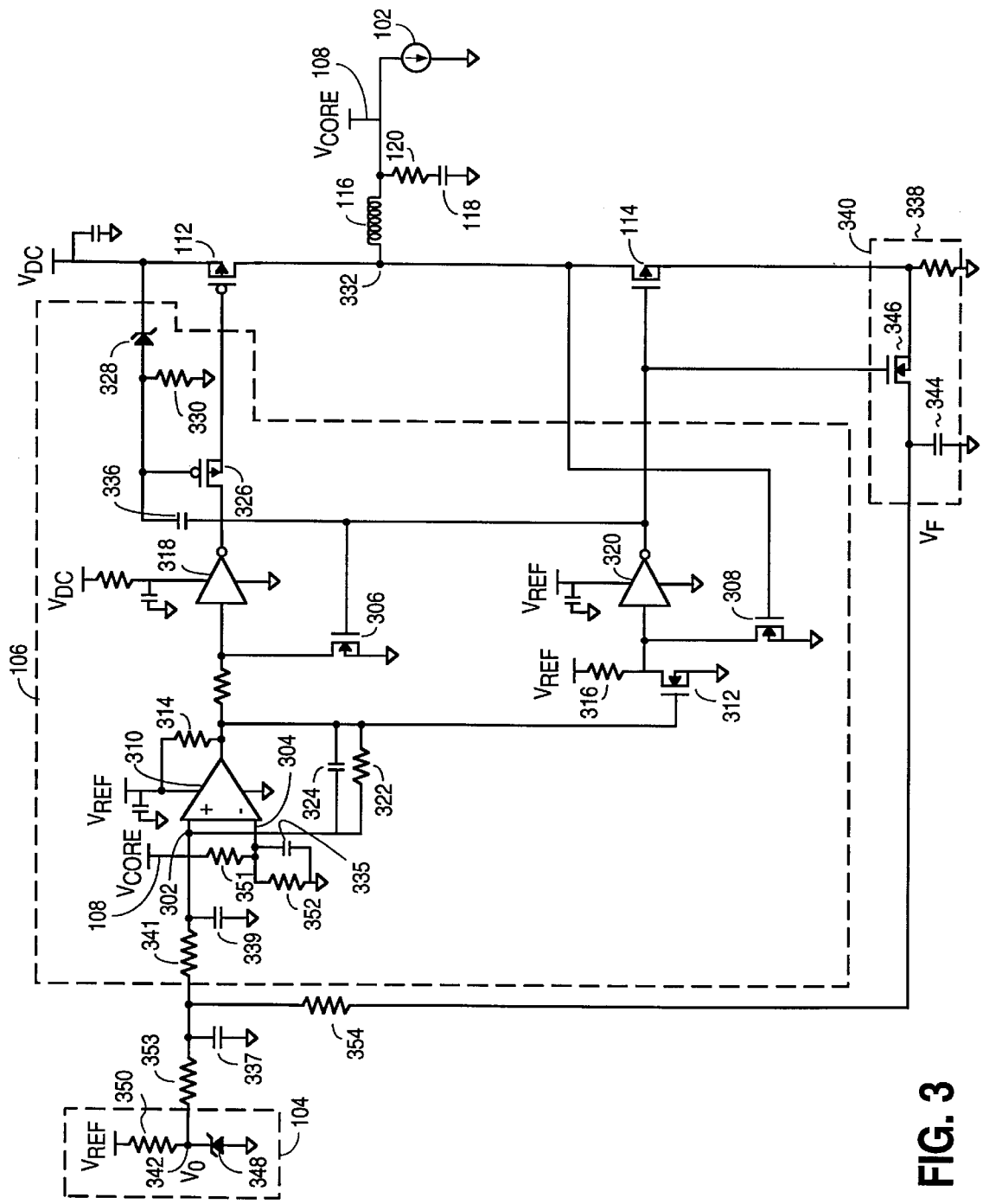
FIG. 3 is a circuit diagram of an exemplary DC-to-DC voltage converter with a sample-and-hold circuit for dynamically changing the set-point.

FIG. 3 is a circuit diagram of an embodiment, where functional block 106 in FIG. 3 provides the function of controller 106 in FIG. 1, functional block 104 in FIG. 3 provides the function of voltage source 104 in FIG. 1, and, when applicable, circuit components in FIG. 3 have the same numeric label as their corresponding circuit components in FIG. 1. $V_{DC}$ is the DC voltage that is stepped down, and $V_{ref}$ is a voltage which may be less than $V_{DC}$. Voltage source 104 in FIG. 3 is comprised of Zener diode 348 and resistor 350 to provide a stable voltage $V_0$ at node 342. A feedback path in FIG. 3 is indicated by labeling the voltages at the two lines 108 as $V_{core}$.

We first describe the particular controller 106 of FIG. 3. To this end, denote the voltage at the non-inverting input 302 by $V_+$ and the voltage at the inverting input 304 by $V_-$. Ignore for the moment FETs 306 and 308. The combination comprising comparator 310 with pullup resistor 314, the inverter circuit comprising FET 312 and pullup resistor 316, inverter driver 318, and driver 320 provides for the switching of FETs 112 and 114 in a complementary fashion, where FET 112 is ON and FET 114 is OFF when $V_+>V_-$ and FET 112 is OFF and FET 114 is ON when $V_+<V_-$. Resistor 322 and capacitor 324, along with resistor 341, provide hysterisis for the trip-point of comparator 310.

When $V_{DC}$ is large enough to exceed the Zener breakdown voltage of Zener diode 328, the combination of Zener diode 328 in series with resistor 330 biases the gate of FET 326 to some voltage $V_b>0$. This biasing allows FET 326 to provide a level shift function to the output of inverter driver 318 so that the gate voltage of FET 112 is prevented from following below $V_b+V_t$ when the output of inverter driver 318 transitions form HIGH ($V_{DC}$) to LOW (ground potential), where $V_t$ is the threshold voltage of FET 326. This level shift function keeps the gate voltage of FET 112 in the range [$V_b+V_t$, $V_{DC}$] so as to prevent gate-source breakdown of FET 112.

If, however, $V_{DC}$ is less than the Zener breakdown voltage, then resistor 330 without the presence of capacitor 336 would keep the gate of FET 326 at ground potential. In this case, if the gate of FET 326 is kept at ground potential, then the gate voltage of FET 112 would not be brought below $V_t$ when the output of driver 318 transistions to LOW. Therefore, if $V_{DC}$ is sufficiently small, then the gate voltage of FET 112 may not be brought low enough to fully turn FET 112 ON. However, with capacitor 336 coupling the gate of FET 326 to driver 320, then if the output of driver 320 transitions from HIGH ($V_{ref}$ in this case) to ground potential, the gate voltage of FET 326 will momentarily be brought below ground potential (approximately $-V_{ref}$) and the gate voltage of FET 112 can be brought to ground potential when the output of driver 318 transitions to ground potential, thereby ensuring that FET 112 is fully turned ON. Note that for sufficiently small $V_{DC}$, i.e., when the Zener breakdown voltage of Zener diode 328 has not been exceeded, the level shift function of FET 326 is not needed.

FETs 306 and 308 prevent FETs 112 and 114 from being simultaneously ON. For example, with $V_+>V_-$ so that FET 112 is ON and node 332 is HIGH, FET 308 is kept ON so as to keep the input to driver 320 LOW, so that FET 114 is kept OFF. When $V_+$ transitions below $V_-$, FET 112 is driven OFF and node 332 will be brought LOW by the collapsing magnetic field of inductor 116. This brings FET 308 OFF to allow the input to driver 320 to be brought HIGH, so that FET 114 switches ON. We see from this example that FET 114 does not switch ON until after FET 112 switches OFF. Similarly, it can be seen that FET 112 does not switch ON until after FET 114 switches OFF.

Capacitor 337 provides a soft-start capability. Capacitor 339 shunts high frequency signal components to ground so as to help prevent unwanted oscillations. Capacitor 335 also helps prevent unwanted oscillations. Note that node 332 is prevented from falling too much below ground, even if FET 114 has not yet switched ON, due to the body diode of FET 114 formed by the connection of the body of FET 114 to its source.

Sample-and-hold circuit 340 provides a feedback voltage $V_f$ stored on capacitor 344, where $V_f$ is indicative of current flowing through resistor 338 when FET 346 is ON. FET 346 is coupled to FET 114 so that it is ON if and only if FET 114 is ON. The current flowing through resistor 338 when sampled by FET 346 is approximately the current I of microprocessor 102. Due to the time constant associated with capacitor 344, $V_f$ is indicative of an average of I. Feedback voltage $V_f$ decreases (increases in magnitude) when current I increases, thereby indicating when microprocessor 102 changes from its stop-clock mode to its active mode.

Controller 106 energizes and de-energizes inductor 116 so as to approximately maintain $V_+=V_-$. Relating $V_+$ and $V_-$ to $V_0$, $V_f$, and $V_{core}$, the relationship $V_+=V_-$ yields the following expression for $V_{core}$ $$V_{core} = \left(1 + \frac{r_1}{r_2}\right)\left[\frac{r_3 V_f + r_4 V_0}{r_3 + r_4}\right],$$

where $r_1$, $r_2$, $r_3$, and $r_4$ are, respectively, the resistances of resistors 351, 352, 353, and 354.

From the above expression, it is seen that the regulated core voltage $V_{core}$ is reduced when $V_f$ decreases. From FIG. 3, it is seen that $V_f$ is approximately given by the voltage drop across resistor 338 when FET 114 is ON, which is approximately $$V_f = -\langle I \rangle R,$$

where R is the resistance of resistor 338 and $\langle I \rangle$ is an average (not necessarily an arithmetic average) of the current I during the period of time for which FET 114 is ON and FET 112 is OFF. Thus, when microprocessor 102 changes from its stop-clock mode to its active mode, $\langle I \rangle$ increases, which causes $V_f$ to decrease and $V_{core}$ to decrease. The core voltage $V_{core}$ will stay at this reduced level until microprocessor 102 changes from its active mode to its stop-clock mode. Thus, the set-point (the voltage to which the core voltage is regulated) of the DC-to-DC voltage converter of FIG. 3 is dynamic.

Figure 4:
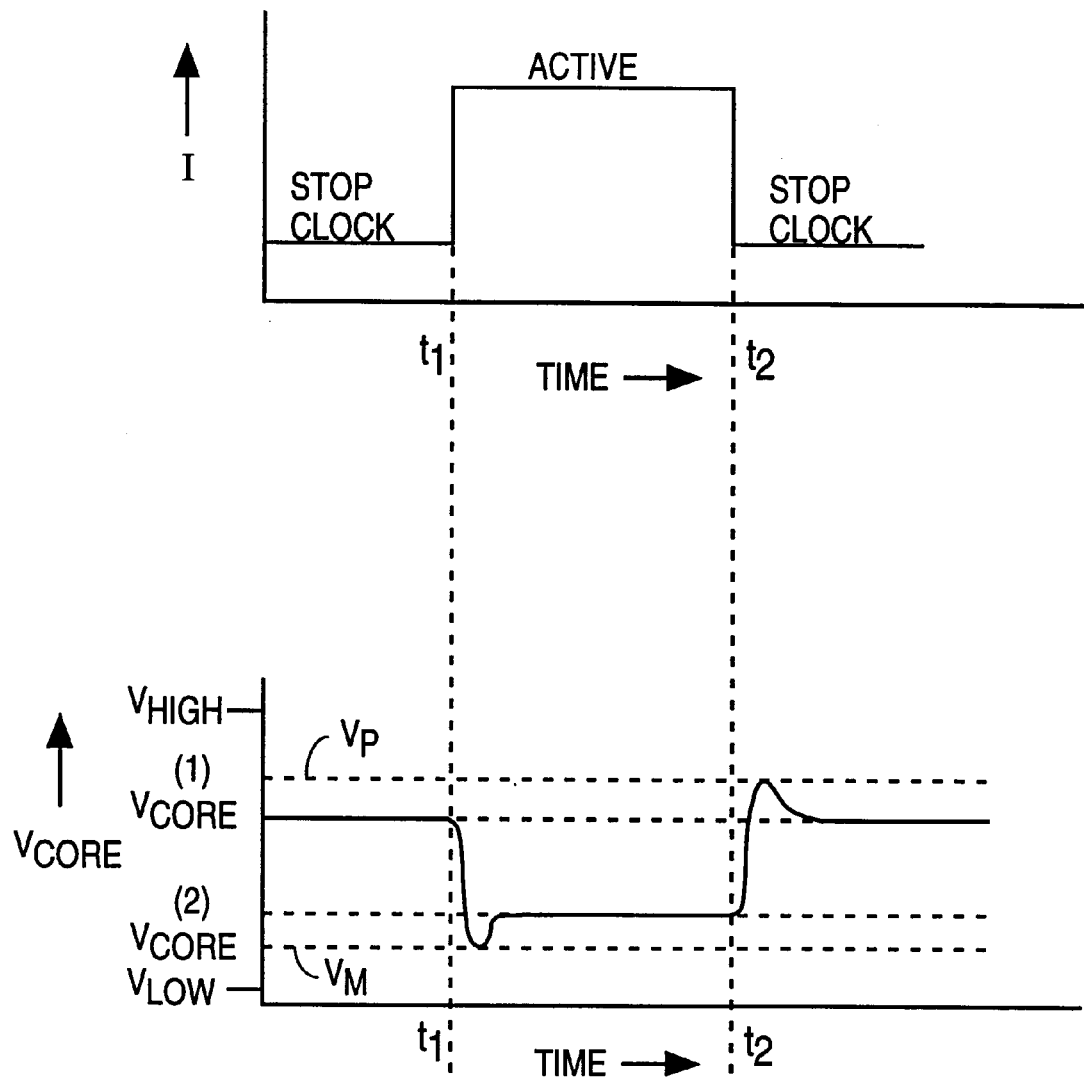
FIG. 4 illustrates changes in core voltage for a change in microprocessor power mode for an exemplary DC-to-DC voltage converter.

FIG. 4 illustrates the dynamic set-point for an exemplary embodiment. FIG. 4a is similar to FIG. 2a. However, as seen in FIG. 4b, the core voltage is regulated to either $V_{core}^{(1)}$ or $V_{core}^{(2)}$ where $$V_{core}^{(1)} = \left(1 + \frac{r_1}{r_2}\right)\left[\frac{-r_3 \langle I \rangle_{sc} R + r_4 V_0}{r_3 + r_4}\right],$$

$$V_{core}^{(2)} = \left(1 + \frac{r_1}{r_2}\right)\left[\frac{-r_3 \langle I \rangle_a R + r_4 V_0}{r_3 + r_4}\right],$$

and $\langle I \rangle_{sc}$ is an average of I when FET 114 is ON and microprocessor 102 is in its stop-clock mode, and $\langle I \rangle_a$ is an average of I when FET 114 is ON and microprocessor 102 is in its active mode.

FIG. 4b illustrates an exemplary plot of core voltage for the current transitions of FIG. 4a. By properly choosing the resistances $r_1$, $r_2$, $r_3$, $r_4$, and R, $V_{core}^{(1)}$ and $V_{core}^{(2)}$ can be properly chosen so that the peak and minimum of $V_{core}$, again denoted by $V_p$ and $V_m$, respectively, are within the operating range [$V_{low}$, $V_{high}$] for microprocessor 102. Furthermore, as long as $|V_{core}^{(1)}-V_{core}^{(2)}|$ is less than $2\Delta$, the total voltage excursion $|V_p-V_m|$ for FIG. 2b can be significantly less than $2\Delta$.

Figure 2:
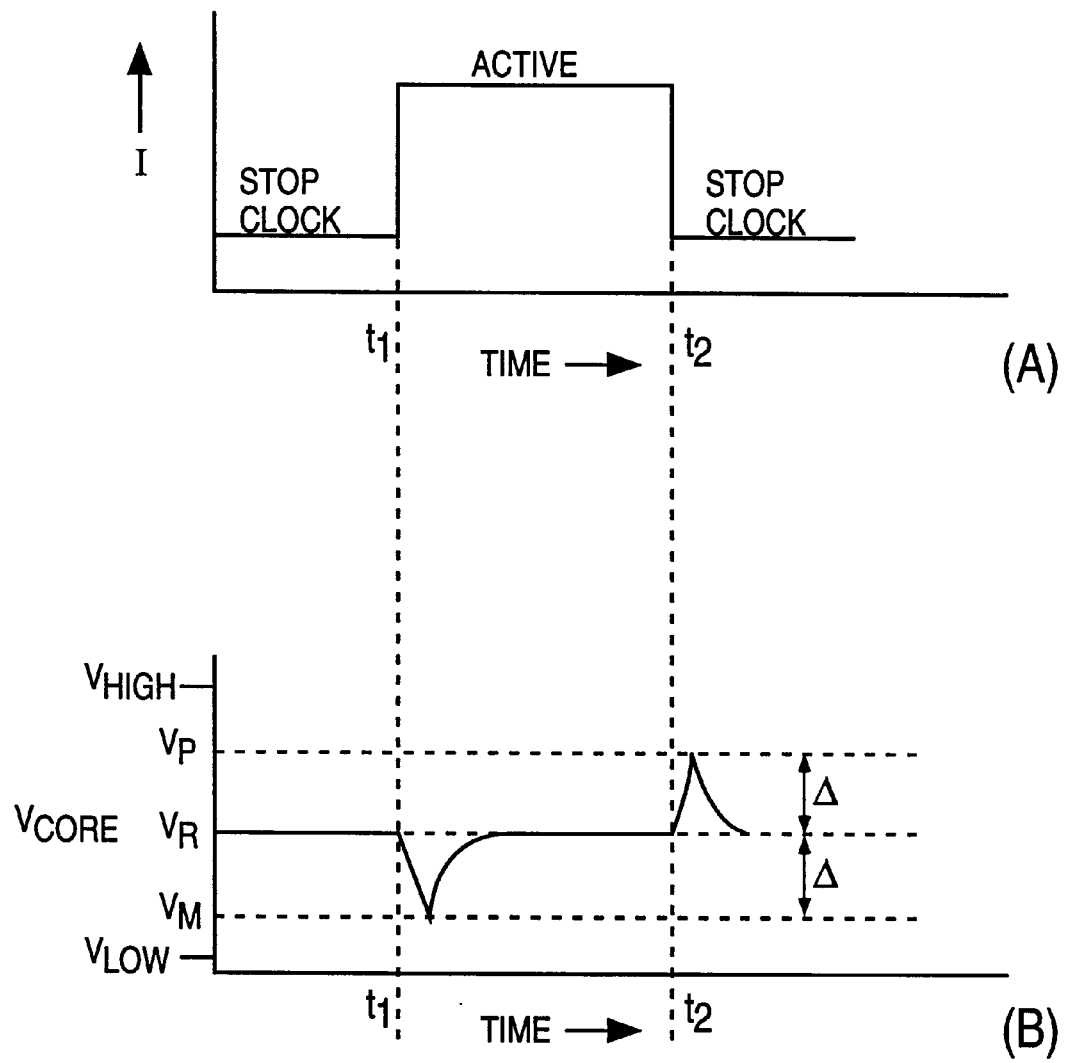
FIG. 2 illustrates changes in core voltage for a change in microprocessor power mode for a prior art DC-to-DC voltage converter.

Furthermore, in comparing FIG. 4b with FIG. 2b, it is seen that if $V_{core}^{(2)}<V_r$ then power consumption of microprocessor 102 for the embodiment of FIG. 3 is reduced when it in its active state as compared to the prior art of FIGS. 1 and 2. Thus, embodiments with dynamic set-points may realize less total voltage swings and reduced power consumption than prior art voltage converters.

The circuit of functional block 106 in FIG. 3 is illustrative of a particular embodiment. Any circuit which switches FETs 112 and 114 in complementary fashion may be used. Indeed, it is not necessary that FETs 112 and 114 be prevented from being ON simultaneously, although power would be wasted in such cases. Furthermore, FET 112 may be either a pMOSFET (p-Metal Oxide Semiconductor Field Effect Transistor) as shown, or an nMOSFET. In other embodiments, bipolar transistors may be used in lieu of FETs, or any other controlled switching device may be used to energize and de-energize an inductor.

Figure 5:
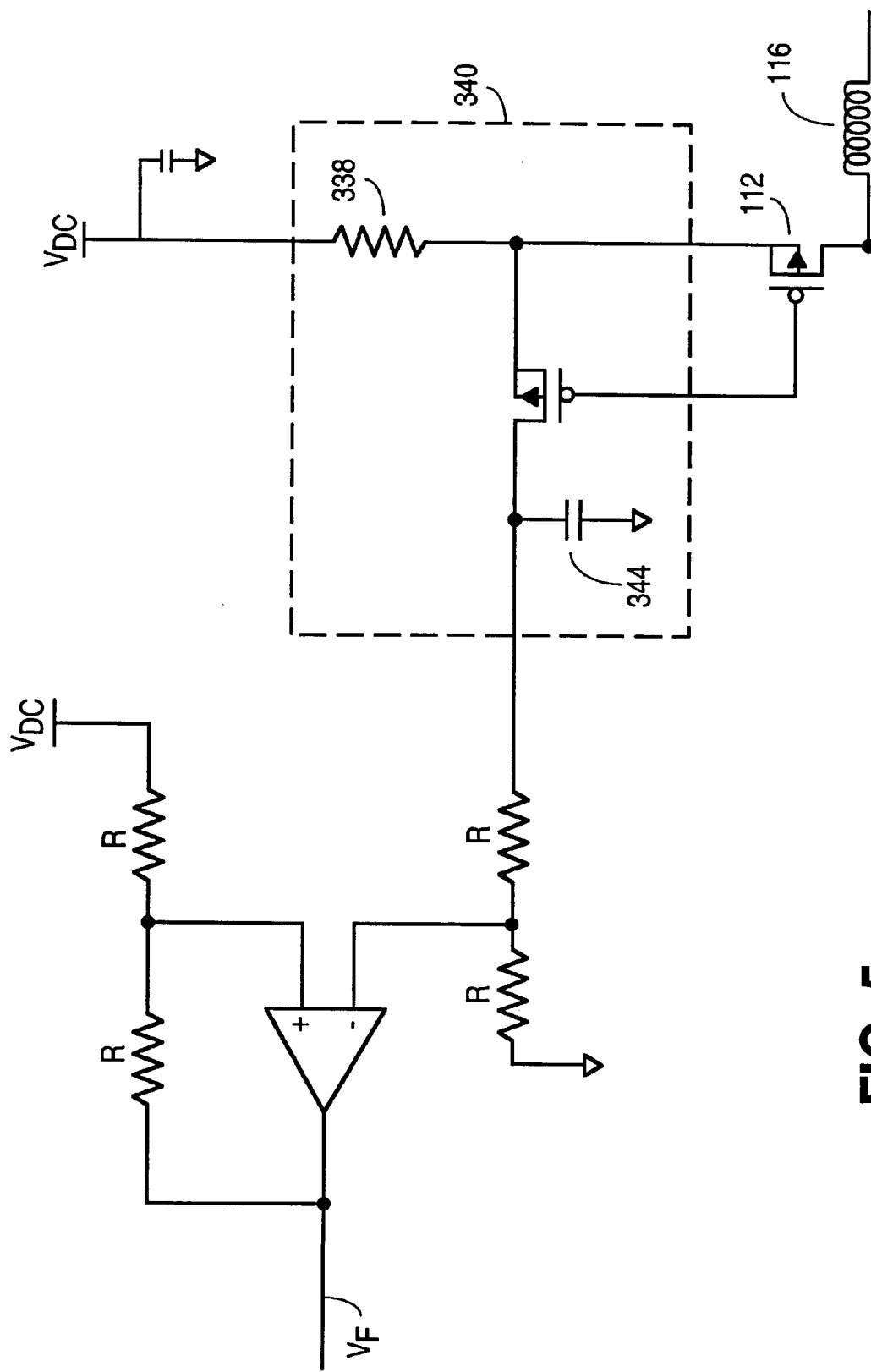
FIG. 5 is a circuit diagram for an exemplary sample-and-hold circuit.

Resistor 338 need not be connected to ground as shown in FIG. 3. For example, sample-and-hold circuit 340 in FIG. 3 may be replaced by sample-and-hold circuit 340 in FIG. 5, where for simplicity only a small portion of the circuit of FIG. 3 is replicated in FIG. 5. Furthermore, a transresistance device may be substituted for resistor 338 to provide a signal indicative of current I. Alternatively, sensors may be used near inductor 116 to provide a signal indicative of its magnetic field.

From the above discussion, it is clear that various modifications may be made to the described embodiments without departing from the invention as claimed below.

What is claimed is:

1. A voltage converter comprising:
   an inductor;
   a controller to regulate a load voltage of a load according to a set-point by energizing and de-energizing the inductor; and
   a sample-and-hold circuit coupled to the controller to decrease the set-point when an average of a current flowing through the inductor increases.

2. The voltage converter as set forth in claim 1, wherein the sample-and-hold circuit comprises:
   a transresistance device to provide, for an at least one time interval, a voltage indicative of the current flowing through the inductor; and
   a capacitor coupled to the transresistance device so that a voltage drop across the capacitor is indicative of the transresistance device voltage during the at least one time interval, wherein the capacitor is coupled to the controller so that the set-point is indicative of the voltage drop across the capacitor.

3. The voltage converter as set forth in claim 2, wherein the at least one time interval is such that power is provided by the voltage converter to the inductor and load during the at least one time interval.

4. The voltage converter as set forth in claim 2, wherein the at least one time interval is such that power is not provided by the voltage converter to the inductor and load during the at least one time interval.

5. The voltage converter as set forth in claim 2, wherein the transresistance device is a resistor, wherein a voltage drop across the resistor is indicative of the current flowing through the inductor during the at least one time interval.

6. The voltage converter as set forth in claim 5, wherein the at least one time interval is such that power is provided by the voltage converter to the inductor and load during the at least one time interval.

7. The voltage converter as set forth in claim 5, wherein the at least one time interval is such that power is not provided by the voltage converter to the inductor and load during the at least one time interval.

8. The voltage converter as set forth in claim 1, further comprising:
   a pull-up transistor;
   a pull-down transistor;
   wherein the pull-up transistor and pull-down transistor are coupled to the inductor so that power is provided to the inductor and load when the pull-up transistor is ON and the pull-down transistor is OFF and power is not provided to the inductor and load when the pull-up transistor is OFF and the pull-down transistor is ON;
   a resistor coupled to the pull-down transistor so that current flowing through the resistor is indicative of a current flowing through the pull-down transistor when ON; and
   a capacitor coupled to the resistor so that a voltage drop across the capacitor is indicative of the voltage drop across the resistor when the pull-down transistor is ON, wherein the set-point is indicative of the voltage drop across the capacitor.

9. A voltage converter comprising:
   a controller;
   an inductor;
   a pull-up transistor;
   a pull-down transistor; the controller to switch the pull-up transistor ON and the pull-down transistor OFF if a first voltage is greater than a second voltage, and to switch the pull-up transistor OFF and the pull-down transistor ON if the first voltage is less than the second voltage;
   a resistor having a voltage drop indicative of a current flowing through the inductor during an at least one time interval;
   a sampling transistor; and
   a capacitor coupled to the sampling transistor and resistor so as to have a voltage drop indicative of the voltage drop across the resistor only if the sampling transistor is ON, the capacitor coupled to the controller to increase the first voltage if the voltage drop across the capacitor increases and to decrease the first voltage if the voltage drop across the capacitor decreases.

10. The voltage converter as set forth in claim 9, wherein the pull-down transistor is ON during the at least one time interval.

11. The voltage converter as set forth in claim 9, wherein the pull-up transistor is ON during the at least one time interval.

12. A voltage converter comprising:
    a controller;
    an inductor;
    a pull-up transistor;
    a pull-down transistor; the controller to switch the pull-up transistor ON and the pull-down transistor OFF if a first voltage is greater than a second voltage, and to switch the pull-up transistor OFF and the pull-down transistor ON if the first voltage is less than the second voltage; and
    a circuit to decrease the first voltage if an average of a current flowing through the inductor during an at least one time interval increases.

13. The voltage converter as set forth in claim 12, wherein the circuit comprises:
    a resistor having a voltage drop indicative of a current flowing through the inductor during the at least one time interval;
    a sampling transistor; and
    a capacitor coupled to the sampling transistor and resistor so as to have a voltage drop indicative of the voltage drop across the resistor only if the sampling transistor is ON, the capacitor coupled to the controller to increase the first voltage if the voltage drop across the capacitor increases and to decrease the first voltage if the voltage drop across the capacitor decreases.

14. The voltage converter as set forth in claim 13, wherein the sampling transistor switches substantially synchronously with the pull-down transistor.

15. The voltage converter as set forth in claim 13, wherein the sampling transistor switches substantially synchronously with the pull-up transistor.

16. A voltage converter comprising:

a controller;

an inductor;

a pull-up transistor;

a pull-down transistor having a terminal; the controller to switch the pull-up transistor ON and the pull-down transistor OFF if a first voltage is greater than a second voltage, and to switch the pull-up transistor OFF and the pull-down transistor ON if the first voltage is less than the second voltage;

a resistor having a first terminal connected to ground and a second terminal connected to the terminal of the pull-down transistor;

a sampling transistor having one terminal connected to the second terminal of the resistor, and having a second terminal; the sampling transistor to be held ON when the pull-down transistor is ON; and a capacitor having a first terminal connected to ground and a second terminal connected to the second terminal of the sampling transistor; the capacitor coupled to the controller to increase the first voltage if a voltage drop across the capacitor increases and to decrease the first voltage if the voltage drop across the capacitor decreases.

* * * * *